DUTY CYCLE CONTROL FOR RADIO BEACONS

Filed May 17, 1960 3 Sheets-Sheet 1

INVENTOR.
GEORGE F. MORRIS
BY
T. L. Styner
ATTORNEY

Jan. 2, 1962 G. F. MORRIS 3,015,816

DUTY CYCLE CONTROL FOR RADIO BEACONS

Filed May 17, 1960 3 Sheets-Sheet 2

United States Patent Office 3,015,816

Patented Jan. 2, 1962

3,015,816
DUTY CYCLE CONTROL FOR RADIO BEACONS

George F. Morris, Rochester, N.Y., assignor to General Dynamics Corporation, Rochester, N.Y., a corporation of Delaware Filed May 17, 1960, Ser. No. 29,664
9 Claims. (Cl. 343—6.8)

This invention relates to radio beacons of the pulse operated radio receiver-transmitter type and is particularly directed to means for establishing a constant duty cycle for the radio transmitter of the beacon.

Radio beacons of the type used in tactical air navigational equipment, commonly known as TACAN, comprise a fixed based transmitter which omnidirectionally radiates pulses of microwave energy. In the TACAN system, an airborne transmitter may interrogate the ground-based beacon on one microwave frequency with coded pulses and expect to receive a reply on another frequency, the transmit time of propagation to and from the radio beacon being a measure of distance. Any number of separate airborne transmitters of from one to more than one hundred may interrogate a single beacon for distance information at one time. If the number of interrogations should reduce to some low number or to zero, the beacon transmitter output will correspondingly reduce. But, since the transmitter must supply azimuthal information to all airplanes in its hemisphere, the pulse output of the beacon transmitter must be maintained at a substantially constant rate or duty cycle. The pulse rate of the currently used TACAN system in this country has been arbitrarily established at about 2,700 pulses per second. Heretofore, the bias and the gain of the IF amplifiers in the receiver circuits of the beacon have been varied to produce varying amounts of noise, the bias voltages being made dependent upon the rate of incoming interrogation pulses to maintain the transmitter output at or near the 2,700 pulses per second. Unfortunately, a change of bias inherently results in a change in the sensitivity of the amplifiers, whereas a constant high level sensitivity is desirable at all times. It follows that when traffic is heavy and interrogating pulses are many, in a conventional TACAN system, the sensitivity of the receiver is reduced and weak signals from more distant interrogating airplanes are not received, detected, and retransmitted.

An object of this invention is to provide an improved radio beacon with means for establishing a substantially constant duty cycle for the radio transmitter of the beacon.

A more specific object of this invention is to provide a radio beacon with a receiver which at all times is of optimum sensitivity and yet which will produce a substantially constant rate of pulses for the transmitter of the beacon.

The objects of this invention are attained by providing a separate noise generator entirely outside the signal amplifying channels of the receiver-transmitter of the beacon. The receiver channels are adjusted to optimum sensitivity with a given and preferably low rate of noise pulses. The total pulse rate in the video circuits of the transmitter, including the interrogating and noise pulses, are sampled, counted, and converted to a bias voltage of such a polarity that when applied to the separate noise generator the random noise pulses generated and applied to the beacon transmitter will maintain the pulse rate at the output of the transmitter at the substantially constant value of, say, 2,700 pulses per second.

Other objects and features of this invention will become apparent to those skilled in the art by referring to specific embodiments described in the following specification and shown in the accompany drawing, in which.

Figure 1:
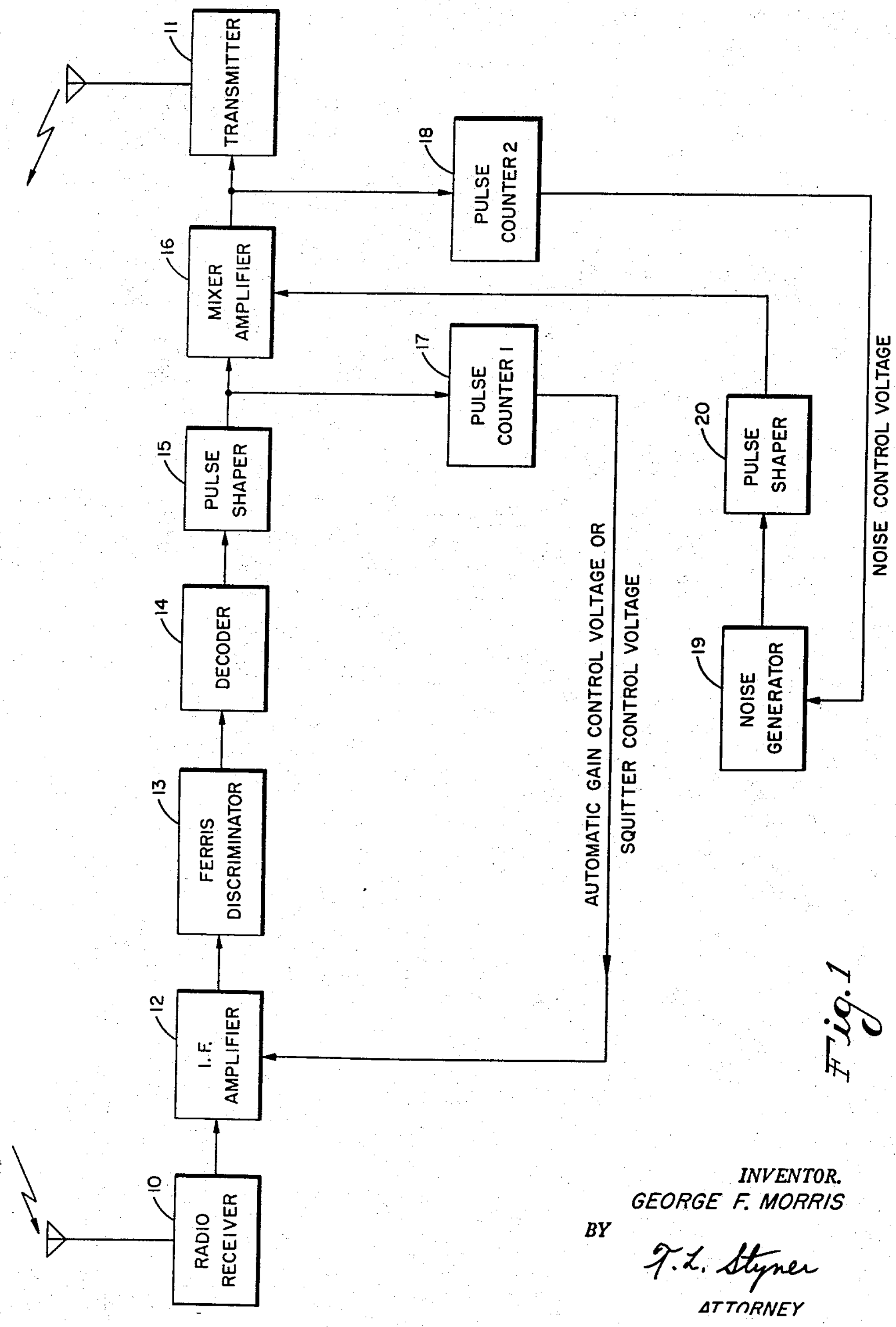
FIG. 1 is a block diagram of one radio beacon embodying this invention.

A beacon of the TACAN type shown in FIG. 1 comprises the radio receiver 10 with RF tuning circuits in the microwave range for receiving interrogating signals from airborne transmitters. The video information of the received waves is demodulated and applied to the modulating circuits of the transmitter 11 for retransmission to the airplane. Inasmuch as the time delay from the receiver to the transmitter is fixed and is known, the distance information between the beacon and the interrogating airborne unit can easily be computed in the airplane. For reasons which are not immediately important here, the interrogating signals from each airplane are actually pairs of pulses accurately spaced twelve microseconds apart. These pairs of pulses as radiated from the airplane are randomly spaced to facilitate separation of many interrogating signals from spurious signals within the beacon circuits. Further, the density of air traffic may vary from saturation to zero, thus imposing upon the beacon a wide range of numbers of interrogating video signals. Now, since transmitter 11 must supply azimuthal information to all airplanes in its hemisphere by a radiating pattern of cardioid shape or other irregular shapes from which azimuth information may be extracted, the means pulse repetition rate at the output of the transmitter 11 must remain substantially constant.

The receiver of FIG. 1 comprises at least one local oscillator and mixer, not shown, for reducing the RF signals to a usable intermediate frequency, which frequency is amplified in amplifier 12. The entire range of video signal frequencies expected from all airplanes is selected by band-pass filters, such as the ferris discriminator 13. The double pulse signals from each airplane, which as stated are pairs of pulses arbitrarily fixed at twelve microsecond spacing, are selected or decoded in decoder 14. Each pulse passing the decoder is amplified, clipped, and stretched in pulse shaper 15. Thereupon, the decoded pulses of uniform amplitude and duration are applied to the modulating circuits of the transmitter through the mixer amplifier 16.

If desired, the gain and sensitivity of the IF amplifier stages at 12 may be controlled by a squitter or automatic gain control voltage obtained by sampling and counting the pulse rate at the output of the pulse shaper 15. Counter 17 preferably produces a gain control voltage which, when applied to the IF amplifier, will maintain the amplifier in a relatively steady condition of sensitivity which will produce a predetermined minimum number of thermal pulses from within the amplifier. By maintaining a minimum rate of noise pulses at the output of the IF amplifier 12, even in the total absence of interrogating signals, the sampling circuits, to be described below, may be maintained in active condition to keep the duty cycle substantially constant.

According to an important and characteristic feature of this invention, the ultimate pulse rate applied to the transmitter, which desirably should be maintained at, say, 2,700 pulses per second, is sampled as by the pulse counter 18 which produces in its output a controlling voltage, preferably a D.C. voltage, that is proportional to the sampled pulse rate. This controlling voltage is applied to the separate noise generator 19, the random noise pulses at the output of which is shaped by pulse shaper 20. The shaped pulses are then added in mixer-amplifier 16 to the interrogating pulses received and decoded by the RF receiver 10, so that the total number stands at about the 2,700 pulses per second rate.

Figure 2A:
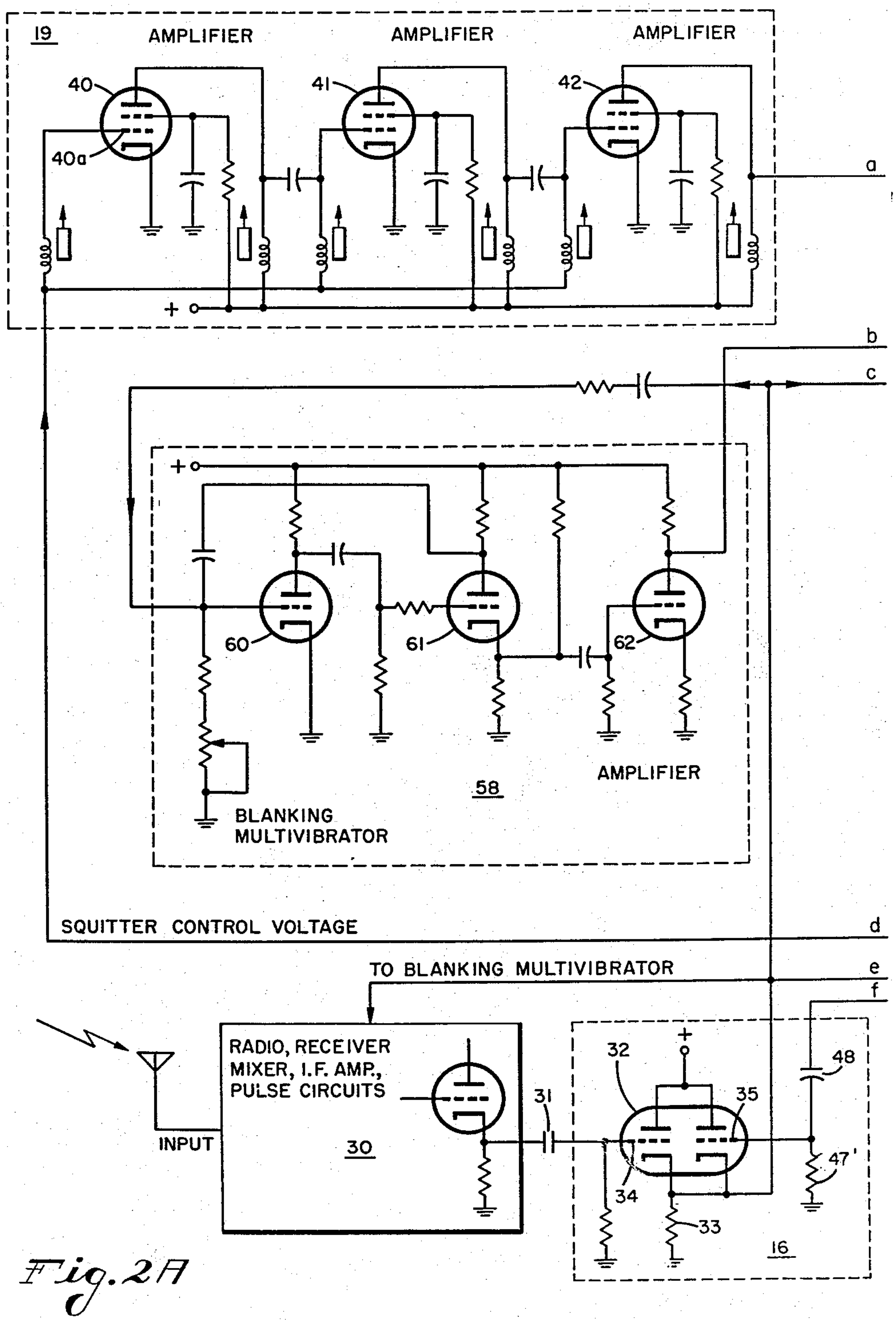
FIGS. 2A and 2B show together schematics of the system of FIG. 1.
Figure 2B:
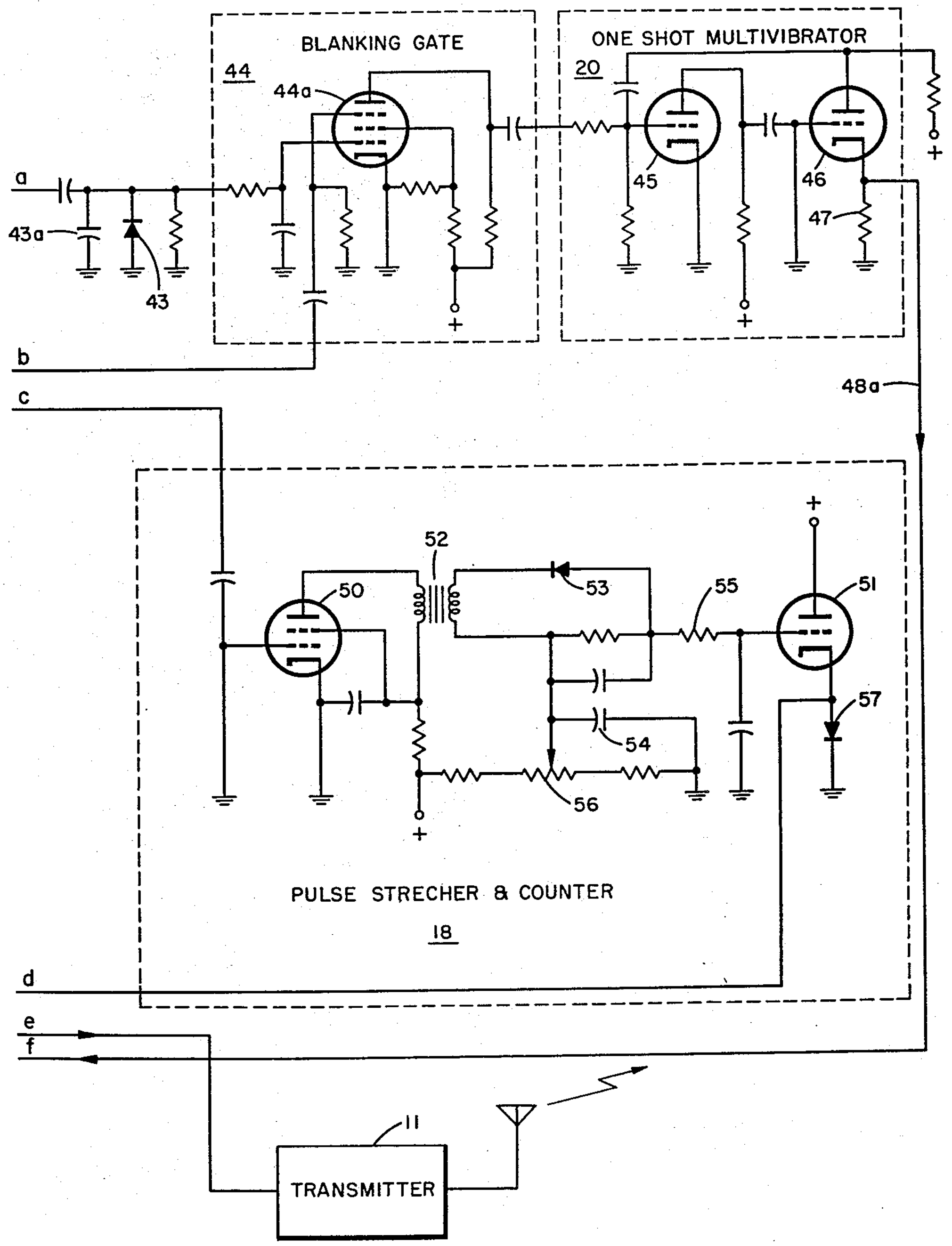

FIGS. 2A and 2B, when placed side-by-side, show in detail one circuit arrangement of the pulse generator 19, pulse shaper 20, and their interconnection with the radio-receiver-transmitter of the beacon. The radio receiver circuits including the mixer, IF amplifiers, and various pulse circuits are bulked in the rectangle 30. The video output of the radio receiver is coupled by condenser 31 to the mixer-amplifier 16 which comprises, in the example shown here, an OR gate circuit with two inputs and one output. The OR gate comprises a double triode 32 with grids 34 and 35. The output of the OR gate, comprising the common cathode resistor 33, is fed directly to the modulating circuits of radio transmitter 11. Pulse signals applied to either grid of the OR gate twin triode produces pulse voltages across the common cathode resistor 33. Grid 34 receives the video output of the radio receiver, this output including all interrogating pulses as well as any locally generated random pulses in the amplifying circuits of the receiver. The other grid 35 receives the separately generated random pulses which when mixed with the pulses at 34 will always equal the predetermined duty cycle rate of the transmitter.

The local separately generated noise pulses are produced in the noise generator 19 which in the example shown comprises three amplifiers, 40, 41 and 42. These amplifiers are of the electron discharge type and are so biased as to not limit the electron flow to the anode, whereupon the shot effect predominates. The tubes are conventionally coupled and are tuned at their several input and output circuits, as by the permeability tuning inductors shown, to a frequency which will produce at the output of amplifier 42 a noise wave containing all frequencies widely distributed throughout the usable spectrum of the beacon. It has been found that by tuning the amplifiers to about four megacycles per second and by biasing at least the first amplifier 40 to produce an output rich in thermal noise pulses, the amplified noise of the following two stages results in noise pulses of sufficient density and amplitude to adequately load the transmitter 11. The density of the random pulses can be varied between wide limits by controlling the voltage on the control grid 40*a* of the first or of all three amplifiers.

The four mc. component of the noise generator 19 is eliminated by the by-pass condensers 43*a* and the pulses of one polarity are shunted out by the diode rectifier 43. The rectified pulses are then amplified in amplifier 44. It has been found convenient to employ a multigrid tube at stage 44 and to apply to the suppressor grid thereof a blanking voltage which will block the amplifier for a predetermined time after each pulse has been passed by the amplifier. Such a device is convenient in establishing the minimum random pulse spacing of the noise generator. The source of the blanking voltage is the blanking multivibrator 58 which will be referred to below.

The random locally generated noise pulses passed by the blanking gate or amplifier 44 is then applied to the pulse shaper 20 which conveniently may comprise a one-shot multivibrator of conventional construction. The cross-feedback circuits between the output and input electrodes of the multivibrator include time constant elements which will produce across cathode resistor 47 a strong positive-going pulse of uniform amplitude and duration. It is recommended that pulse duration of three to four microseconds and 30 volt amplitude be employed. The voltage from across cathode resistor 47 is applied through line 48*a* and coupling condenser 48 and across resistor 47' to the grid 35 of the double triode OR gate 16. Hence, locally and separately generated random pulses are added to the interrogating pulses of the radio receiver and are applied to the transmitter 11.

To obtain the necessary information from the output of the OR gate to maintain its pulse rate substantially constant, part of this output is applied to the pulse counter 18. The specific counter shown includes the amplifier 50 coupled through transformer 52 to amplifier 51. Following the transformer coupling 52 is the rectifier 53 and the CR time constant circuits 54, 55 and 56, so chosen as to integrate the sampled and amplified pulses and to produce a direct current, the amplitude of which is proportional to the average sampled pulse rate. The counter circuit is conveniently coupled by means of the cathode loading diode 57, thus clamping the squitter control voltage with respect to ground and eliminating all negative-going components of the integrated voltages. The voltage across diode 57 is applied directly to the control grids of the noise generator 19. The parameters of the noise generators and the amplitude swing of the squitter control voltage are so chosen that the pulse output of the noise generator will vary from zero, or some low number, to 2,700.

The sampled output of the OR gate 16 is also applied to the control grid of tube 60 of the blanking multivibrator 58. The two triodes 60 and 61 are cross-coupled as in a conventional one-shot multivibrator to produce a strong positive stable pulse of about sixty microseconds duration immediately following each transmitted pulse. While sixty microseconds have been found desirable, the delay could be adjusted to greater or less values. The output of the multivibrator is amplified in tube 62, the load circuit of which is coupled directly to a grid of the blanking tube 44*a*. The suppressor grid is chosen here.

The phase reversal by tube 62 accordingly applies a negative-going pulse to the suppressor grid, which pulse is of sufficient amplitude to positively block amplifier 44 for the duration of the delay established by the blanking multivibrator 58. The delay periods of the blanking circuits may be adjusted for any delay period desired or may in fact be eliminated if a minimum repetition rate is not required.

Many modifications may be made in the specific noise generator and pulse sampling circuits of this invention without departing from the scope of the invention as defined in the appended claims.

What is claimed is:

1. A radio beacon comprising a radio frequency receiver and a radio frequency transmitter, said receiver being capable of receiving and demodulating pulse signals of random rates, means responsive to the pulse signals from said receiver for modulating the radio frequency output of said transmitter; a separate noise generator for producing pulses of random occurrence, means responsive to the random pulses of said noise generator for pulse modulating the radio frequency output of said transmitter, and means responsive to the average repetition rate of said pulse signals of said transmitter and operative upon said noise generator for inversely changing the average rate of generated noise pulses so that the average pulse repetition rate of said transmitter output will be substantially constant.

2. A radio beacon comprising a radio frequency transmitter, a source of pulse signals of random rates, means responsive to the pulse signals from said source for modulating the radio frequency output of said transmitter; means for maintaining substantially constant the duty cycle of said transmitter including a noise generator for producing pulse of random occurrence, means responsive to the random pulses of said noise generator for modulating the radio frequency output of said transmitter, and means responsive to the average repetition rate of said pulse signals and operative upon said noise generator for inversely changing the average rate of generated noise pulses so that the total average pulse repetition rate of the transmitter output will remain substantially constant.

3. A radio beam comprising an RF transmitter, an RF receiver for receiving, detecting and decoding received pulse signals, means responsive to pulse signals from said receiver for modulating said RF transmitter, a modulator having two input circuits and one output circuit, one of said inputs being coupled to said RF receiver and said output being coupled to said RF transmitter, a noise generator, said generator being responsive to a variable bias voltage for producing random pulses of variable density, said noise generator being coupled to the other of said input circuits, means responsive to the pulses of said RF transmitter for generating a bias voltage proportional to the pulse rate at the input of the RF transmitter, and means for applying the variable bias voltage to said noise generator for maintaining the pulse rate at the output of said RF transmitter at a substantially constant rate.

4. A constant duty cycle circuit for a beacon, said beacon comprising an RF receiver, an RF transmitter, and a noise generator, the pulse density at the output of said generator being adjustable in response to a variable voltage bias, means for mixing the pulse output of said RF receiver with the pulse output of said noise generator, means for modulating said RF transmitter with the total of said pulses, means for generating a variable bias in accordance with the rate of occurrence of said total pulses, and means for applying said voltage to said noise generator to produce changes in the noise pulse rate in inverse proportional relations with the rate of occurrence of the total pulse rate.

5. In a constant duty cycle control circuit for a beacon having an RF receiver for receiving, detecting and decoding interrogating pulses of an RF frequency, an RF transmitter, and a mixer amplifier coupling the decoding pulse output of said receiver to the input of said transmitter; a noise generator for producing random noise-type pulses, the density of said noise pulses being responsive to a noise control voltage, means responsive to the pulse rate of said transmitter for generating a noise control voltage, means for applying said noise control voltage to said noise generator, and means for applying the noise output of variable pulse density to the input of said mixer amplifier for maintaining substantially constant the pulse rate applied to the input of said transmitter.

6. A constant duty cycle system for a radio beacon having a radio receiver and a radio transmitter, said system comprising a separate noise generator for producing noise pulses of variable density in response to a variable bias voltage; an OR gate, having two input circuits and one output circuit, for relaying signals to the output circuit from either or both of said input circuits, said input circuits being coupled, respectively, to the output of said radio receiver and the output of said noise generator, the output of said gate being coupled to said radio transmitter, a pulse counter, said pulse counter being connected to said transmitter and being adapted to generate a bias voltage proportional to the density of pulses transmitted by said transmitter, and means for applying said bias voltage to said noise generator, the bias voltage being variable in such a manner as to tend to keep constant the density of pulses transmitted.

7. In combination in a beacon, a radio receiver, a radio transmitter, a noise generator, said noise generator being responsive to a variable bias voltage to change the density of noise pulses at the output of said generator, an OR gate consisting of a double triode, said double triode including two control grids and having a common cathode resistor so that signals at either grid appear across said resistor, said two grids being coupled, respectively, to the output of said radio receiver and to the output of said noise generator, said common cathode resistor being coupled to the input to said radio transmitter, a pulse counter connected to said transmitter for integrating the transmitter pulses and generating a bias voltage proportional to the density of pulses radiated by said transmitter, and means for applying said bias voltage to said noise generator.

8. In combination in a radio beacon, a radio receiver, a radio transmitter, a noise generator, means for modulating said transmitter with the output signals of either said noise generator or said receiver, a blanking gate coupled between said noise generator and the input to said transmitter, an adjustable blanking monostable multivibrator of the one-shot type for producing blanking pulses of variable widths, said multivibrator being coupled to said blanking gate for disabling the output of said noise generator for adjustable predetermined periods of time after each pulse, and means responsive to the density of pulses relayed by said transmitter for varying the density of pulses generated by said noise generator.

9. A radio beacon comprising a radio receiver, a radio transmitter, and a separate noise generator; said noise generator comprising an electron discharge tube with a control grid so biased as to produce an output voltage of noise pulses of relatively high density, the density of pulses being a function of the bias voltage applied to said control grid, means for applying the output noise pulses of said noise generator to said radio transmitter, and means responsive to the pulses relayed by said transmitter for varying said grid bias.

References Cited in the file of this patent

UNITED STATES PATENTS 2,530,096 Sudman ---------------- Nov. 14, 1950

FOREIGN PATENTS 785,707 Great Britain ----------- Nov. 6, 1957

UNITED STATES PATENT OFFICE
CERTIFICATE OF CORRECTION

Patent No. 3,015,816 January 2, 1962

George F. Morris

It is hereby certified that error appears in the above numbered patent requiring correction and that the said Letters Patent should read as corrected below.

Column 3, line 64, before "pulse" insert -- a --; column 4, line 62, for "pulse" read -- pulses --; column 5, line 27, strike out "an", first occurrence.

Signed and sealed this 5th day of June 1962.

(SEAL)
Attest:

ERNEST W. SWIDER
Attesting Officer

DAVID L. LADD
Commissioner of Patents